United States Patent
Zou et al.

(10) Patent No.: US 11,184,115 B2
(45) Date of Patent: Nov. 23, 2021

(54) HARQ PROCESS FOR GRANT-FREE UPLINK TRANSMISSIONS

(71) Applicant: Telefonaktiebolaget LM Ericsson (publ), Stockholm (SE)

(72) Inventors: Zhenhua Zou, Solna (SE); Shehzad Ali Ashraf, Aachen (DE); Gustav Wikström, Täby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 158 days.

(21) Appl. No.: 16/345,911

(22) PCT Filed: Jan. 31, 2018

(86) PCT No.: PCT/EP2018/052440
§ 371 (c)(1),
(2) Date: Apr. 29, 2019

(87) PCT Pub. No.: WO2018/171964
PCT Pub. Date: Sep. 27, 2018

(65) Prior Publication Data
US 2019/0268104 A1    Aug. 29, 2019

Related U.S. Application Data

(60) Provisional application No. 62/476,334, filed on Mar. 24, 2017.

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1678* (2013.01); *H04L 1/1887* (2013.01); *H04L 5/0055* (2013.01)

(58) Field of Classification Search
CPC ....... H04L 1/18; H04L 1/1678; H04L 1/1887; H04L 5/0055
See application file for complete search history.

(56) References Cited

U.S. PATENT DOCUMENTS

| 2013/0250869 A1 | 9/2013 | Eriksson |
| 2014/0254544 A1 | 9/2014 | Kar Kin Au et al. |

(Continued)

FOREIGN PATENT DOCUMENTS

| CN | 101132262 A | 2/2008 |
| CN | 103298089 A | 9/2013 |
| CN | 105284172 A | 1/2016 |

OTHER PUBLICATIONS

International Search Report and Written Opinion dated Apr. 19, 2018 for International Application No. PCT/EP2018/052440 filed on Jan. 31, 2018 consisting of 14-pages.

(Continued)

*Primary Examiner* — Justin R Knapp
(74) *Attorney, Agent, or Firm* — Christopher & Weisberg, P.A.

(57) ABSTRACT

A wireless device, network node and a method for managing a hybrid automatic repeat request (HARQ) process for grant-free uplink access. The method includes transmitting data to a network node during a first time slot corresponding to a first PID according to a first mapping. The method further includes receiving a HARQ feedback signal indicating one of an acknowledgement, ACK, and a non-acknowledgement, NACK, associated with the first PID. When a NACK is received, an indication of a second time slot for a retransmission is received. The data corresponding to the first PID is retransmitted during the second time slot.

28 Claims, 11 Drawing Sheets

(51) Int. Cl.
*H04L 1/00* (2006.01)
*H04L 5/00* (2006.01)

(56) References Cited

U.S. PATENT DOCUMENTS

| | | |
|---|---|---|
| 2015/0188673 A1 | 7/2015 | Torsner et al. |
| 2017/0034845 A1 | 2/2017 | Liu et al. |
| 2019/0229843 A1* | 7/2019 | Yoshimoto ............ H04L 1/0072 |

OTHER PUBLICATIONS

3GPP TS 36.321 V14.2.0; 3rd Generation Partnership Project; Technical Specification Group Radio Access Network; Evolved Universal Terrestrial Radio Access (E-UTRA); Medium Access Control (MAC) protocol specification (Release 14), Mar. 2017, consisting of 106-pages.

Chinese Office Action with English Summary Translation dated Sep. 6, 2021 for Patent Application No. 201880034166.1, consisting of 19-pages.

* cited by examiner

HARQ PROCESS FOR GRANT-FREE UPLINK TRANSMISSIONS

CROSS-REFERENCE TO RELATED APPLICATIONS

This application is a Submission Under 35 U.S.C. § 371 for U.S. National Stage Patent Application of International Application Number: PCT/EP2018/052440, filed Jan. 31, 2018 entitled "HARQ PROCESS FOR GRANT-FREE UPLINK TRANSMISSIONS," which claims priority to U.S. Provisional Application No. 62/476,334, filed Mar. 27, 2017, entitled "METHODS OF HARQ PROCESS HANDLING IN GRANT-FREE UL," the entireties of both of which are incorporated herein by reference.

FIELD

Wireless communications, and in particular, a method, network nodes, and wireless devices for managing a hybrid automatic repeat request (HARQ) process for grant-free uplink (UL) transmissions.

BACKGROUND

In Long-Term Evolution (LTE), resources for uplink (UL) transmissions, i.e., transmissions from a wireless device to a network node, are granted by the network node, i.e., a base station, for example, an Evolved Node B (eNB). A network node, as that term is used herein, is a general term and can correspond to any type of radio network node or any network node which communicates with a wireless device and/or with another network node.

In LTE, the resources granted for UL transmissions by the network node can be granted dynamically, i.e., the network node schedules the UL transmission per transmission time interval (TTI). Alternatively, this can be done using the semi-persistent scheduling (SPS) framework, so that multiple TTIs are granted at the same time, i.e., prior to a data transmission. This grant is considered a configured grant so that data transmissions happen according to resource allocation and modulation and coding scheme (MCS) in subsequent SPS occasions.

In LTE Rel-14, the SPS framework is enhanced under the name of "Instant Uplink Access (IUA)" or "Fast Uplink Access" to allow consecutive TTIs to be persistently allocated to a user. Since the round-trip-time for the transmission feedback is typically larger than one TTI, multiple SPS hybrid automatic repeat request (HARQ) processes are needed. Since the HARQ ID is not indicated per TTI, formulas have been specified (e.g., TS 36.321 V 14.2.0) for both downlink (DL), i.e., from the network node to the wireless device, and uplink (UL), i.e., from the wireless device to the network node. With SPS, these formulas enable derivation of the HARQ ID from the absolute system frame number (SFN) and subframe number, which is known in both the network node and the wireless device, i.e., user equipment (UE).

The formulas specified for both DL and UL SPS used to derive the HARQ process ID (PID) from the absolute SFN and subframe number is in alignment with the synchronous HARQ concept in LTE UL. In LTE-frequency division duplex (FDD), HARQ processes for uplink transmission are synchronous, i.e., a specific process number is used as a subframe number. In LTE, the wireless device uses the same HARQ process ID (PID) every 8 TTIs. Retransmission of the data, if needed, with the same HARQ, happens every 8 TTIs. Since the wireless device uses specific HARQ process IDs at specific subframes, the network node knows exactly which HARQ process is to arrive and when.

The number of parallel HARQ processes is determined by the expectation of the process time at the network node and the wireless device. A fixed number of HARQ process numbers and the synchronous UL HARQ, on the other hand, puts a lower limit on the round-trip-time for the feedback and is not efficient for low-latency services requiring fast retransmissions. For instance, if the HARQ feedback for a certain HARQ process ID is not received in a synchronous manner (i.e., at the expected TTI), the corresponding retransmission will have to wait a certain number of TTIs/subframes according to the pre-define HARQ process identification (PID) allocation. There have been discussions in LTE that UL asynchronous HARQ is supported so that the retransmission can be dynamically signaled by the network node so that the round-trip-time is smaller than 8 TTIs.

When considering the New Radio (NR) for 5G, it has been agreed that similar principles are adopted. Specifically, at least semi-static resource (re-)configuration is supported as a grant-free framework, which is similar to the SPS and fast uplink access in LTE in which the transmission opportunities are pre-configured with a periodicity. The UL HARQ process is aimed to be asynchronous in design.

SUMMARY

One way to support asynchronous HARQ is to allow the wireless device to choose its HARQ process ID and inform the network node about the HARQ process ID by transmitting certain pre-defined uplink control signaling along with the UL data transmission. However, this results in a need for a new uplink control channel design in addition to the increase in signaling overhead and interference. Furthermore, in a centralized network, the network node should be in control of scheduling the HARQ PID for the associated wireless devices.

Furthermore, if the HARQ process ID is not carried in the UL transmission, there is a need for both the network node and the wireless device to keep in synchronization with respect to HARQ process IDs. However, current solutions, as specified for LTE UL and SPS transmissions, of deriving the process ID from the SFN and subframe number are not flexible to support asynchronous HARQ, resulting in extra retransmission delays which can be crucial for latency-critical services.

To illustrate these problems, it is assumed that the synchronized process ID follows the pattern [1, 2, 3, 4, 1, 2, 3, 4] as illustrated in the figures described below. It should be noted that any other pattern or number of HARQ process IDs can be used. As shown in FIGS. 1 and 2, the wireless device is ready to retransmit the data for PID=1 (after receiving a negative acknowledgement, i.e., "NACK") on a slot, when the pre-scheduled HARQ process ID is 3. The solution, as shown in FIG. 1, postpones the retransmission to when it is scheduled for HARQ process ID 1, where gNB refers to a base station in a New Radio (NR) network. This is not efficient for low latency services. Another solution, as shown in FIG. 2, would be to simply overwrite the data (i.e., without any intelligent over-writing rules) for the PID corresponding to the slot where the retransmission takes place. This behavior could lead to transmission loss for PID 3. The term "time slot" will be used in a radio technology agnostic manner to refer to the subdivision in time of the transmission. Depending on the radio access technology, different terms may be used to refer to essentially the same concept, i.e. identifying the transmission timeframe subdivision used for scheduling, for example 'slot', 'timeslot', 'subframe (SF)', 'Transmission Time Interval' (TTI), 'short TTI', 'sub-slot', 'mini-slot'.

As explained above, a fixed number of HARQ process numbers and synchronous UL HARQ puts a lower limit on the round-trip-time for the HARQ feedback and is not efficient for low-latency services requiring fast retransmissions. In contrast, an advantage of solutions presented herein is the ability to achieve low-latency by utilization of asynchronous HARQ without substantial overhead signaling requirements. Thus, in some embodiments, when a HARQ NACK is received at the wireless device and there is an earlier available time slot that the wireless device may use for retransmission of the non-acknowledged data that occurs before the statically defined time slot for retransmission, then the retransmission is performed in the earlier available time slot, and the transmission or non-transmission that would otherwise have occurred in the earlier available time slot is deferred to a later time slot. This provides the advantage that the wireless device is able to retransmit erroneously received data at an earlier time slot than when its semi-static resource configuration would normally allow. This provides the advantage that the retransmission can be processed more quickly, resulting in an improved transmission rate.

Embodiments disclosed herein describe ways to handle HARQ process IDs for grant-free UL access. As used herein, the term "grant-free" such as is used to refer to "grant-free uplink transmissions" refers to uplink transmission without dynamic scheduling and without a configured grant. In one embodiment of the present disclosure, when an UL transmission has been allocated a process ID which corresponds to a time slot, a downlink control information (DCI)-based HARQ feedback, along with corresponding HARQ PID, exchanges or intelligently changes the content or the indices of the pre-configured/pre-defined HARQ processes for certain slots. This provides the advantage that the UL retransmission can be made sooner than the predefined allocation which can improve the transmission rate. Since the embodiment allows the mapping to be at least temporarily swapped with another mapping, wherein the second times lot is not being used that instant, the semi-persistent scheduling can be adapted to perform retransmissions in a more efficient manner. In another embodiment, a DCI-based HARQ feedback carries an index (instead of a HARQ PID) that points back in time to a certain transmission. In other words, it carries a pointer to a certain slot transmission. In addition, upon retransmissions, the grant-free process can be moved to a grant-based HARQ process, whose process ID is also indicated in the DCI-based HARQ feedback.

In an aspect, a method performed by a wireless device for managing hybrid automatic repeat request, HARQ, processes for grant-free uplink transmissions, the uplink transmission being allocated process identifications (PIDs) which have predefined mappings to time slots, is provided. The method includes transmitting data to a network node during a first time slot corresponding to a first PID according to a first mapping. The method further includes receiving a HARQ feedback signal indicating one of an acknowledgement, ACK, and a non-acknowledgement, NACK, associated with the first PID. When a NACK is received, the method includes receiving an indication of a second time slot for a retransmission, and retransmitting the data corresponding to the first PID during the second time slot.

According to this aspect, in some embodiments, the second time slot corresponds to a second PID according to a second mapping, the data corresponding to the first PID being retransmitted corresponding to the second PID. In some embodiments, the method further includes reverting to a previous mapping for a data transmission subsequent to the retransmission. In some embodiments, the method further includes mapping the first PID to the time slot for the second PID for a data transmission subsequent to the retransmission. In some embodiments, the second mapping is maintained for a predetermined time interval. In some embodiments, both the first and second mappings are known to the network node. In some embodiments, the second mapping includes exchanging a time slot mapped to the first PID under the first mapping for a time slot mapped to a second PID under the first mapping. In some embodiments, exchanging occurs only if a transmission opportunity for the retransmission occurs before a predetermined time. In some embodiments, the second mapping includes delaying a sequence of PIDs by at least one time slot. In some embodiments, the method further includes receiving the PID of the transmitted data to be retransmitted. In some embodiments, the method further includes receiving an index, the index to identify the time slot corresponding to the transmission to which the HARQ feedback corresponds. In some embodiments, the index provides an indication of earlier-in-time grant-free slot groupings. In some embodiments, the HARQ feedback further includes a notification of a PID with which a grant-free process is to be retransmitted as a grant-based transmission. In some embodiments, the HARQ feedback and the notification of the PID with which the grant-free process is to be retransmitted as a grant-based transmission are sent as separate messages. In some embodiments, the predefined mapping is one of temporary and permanent.

According to another aspect, in some embodiments, a wireless device for managing hybrid automatic repeat request, HARQ, processes for grant-free uplink transmissions, the uplink transmission being allocated process identifications, PIDs, which have predefined mappings to time slots is provided. The wireless device includes a communication interface configured to transmit data to a network node during a first time slot corresponding to a first PID according to a first mapping. The communication interface is also configured to receive a HARQ feedback signal indicating one of an acknowledgement, ACK, and a non-acknowledgement, NACK, associated with the first PID. When a NACK is received, the communication interface is configured to receive an indication of a second time slot for a retransmission, and retransmit the data corresponding to the first PID during the second time slot.

According to this aspect, in some embodiments, the second time slot corresponds to a second PID according to a second mapping, the data corresponding to the first PID being retransmitted corresponding to the second PID. In some embodiments, the processing circuitry is further configured to revert to the predefined mapping for a data transmission subsequent to the retransmission. In some embodiments, the processing circuitry is further configured to map the first PID to the time slot for the second PID for a data transmission subsequent to the retransmission. In some embodiments, the second mapping is maintained for a predetermined time interval. In some embodiments, both the first and second mappings are known to the network node. In some embodiments, the second mapping includes exchanging a time slot mapped to the first PID under the first mapping for a time slot mapped to a second PID under the first mapping. In some embodiments, exchanging occurs only if a transmission opportunity for the retransmission occurs before a predetermined time. In some embodiments, the second mapping includes delaying a sequence of PIDs by at least one time slot. In some embodiments, the communication interface 38 is further configured to receive the PID of the transmitted data to be retransmitted. In some embodiments, the communication interface is further configured to receive an index to identify the time slot corresponding to the transmission to which the HARQ feedback corresponds. In some embodiments, the index provides an indication of earlier-in-time grant-free slot groupings. In some embodiments, the HARQ feedback further includes a notification of a PID with which the grant-free process is to be retransmitted as a grant-based transmission. In some embodiments, the HARQ feedback and the notification of the process ID with which the grant-free process is to be retransmitted as a grant-based transmission are sent as separate messages. In some embodiments, the predefined mapping is one of temporary and permanent.

According to another aspect, a wireless device for managing hybrid automatic repeat request, HARQ, processes for grant-free uplink transmissions is provided. The wireless device includes a communication interface module for transmitting data to a network node during a first time slot corresponding to a first PID. The communication interface module is also for receiving a HARQ feedback signal indicating one of an acknowledgement, ACK, and a non-acknowledgement, NACK, associated with the first PID. When a NACK is received the communication interface is further configured to receive an indication of a second time slot for a retransmission, and retransmit the data corresponding to the first PID during the second time slot.

According to yet another aspect, a method performed by a network node for managing hybrid automatic repeat request, HARQ, processes for grant-free uplink transmissions is provided. The method includes receiving, from a wireless device, a data transmission in a first time slot corresponding to a first PID under a first mapping. The method further includes transmitting a HARQ feedback signal indicating one of an acknowledgement, ACK, and a non-acknowledgement, NACK, associated with the first PID, according to whether the received data transmission is successfully decoded. When a NACK is transmitted the method includes transmitting an indication of a second time slot for a retransmission. The method also includes receiving retransmitted data corresponding to the first PID during the second time slot.

According to this aspect, in some embodiments, the second time slot corresponds to a second PID according to a second mapping, the data corresponding to the first PID being retransmitted corresponding to the second PID. In some embodiments, both the first and second mappings are known to the wireless device. In some embodiments, the received retransmitted data contains an index identifying the data as retransmitted data.

According to another aspect, a network node for managing hybrid automatic repeat request, HARQ, processes for grant-free uplink transmissions is provided. The network node includes a communication interface configured to receive from a wireless device a data transmission in a first time slot corresponding to a first PID under a first mapping. The communication interface is further configured to transmit a HARQ feedback signal indicating one of an acknowledgement, ACK, and a non-acknowledgement, NACK, associated with the first PID, according to whether the received data transmission is successfully decoded. When a NACK is transmitted the communication interface transmits an indication of a second time slot for a retransmission, and receives retransmitted data corresponding to the first PID during the second time slot.

According to this aspect, in some embodiments, the second time slot corresponds to a second PID according to a second mapping, the data corresponding to the first PID being retransmitted corresponding to the second PID. In some embodiments, both the first and second mappings are known to the wireless device. In some embodiments, the received retransmitted data contains an index identifying the data as retransmitted data.

According to yet another aspect, a network node for managing hybrid automatic repeat request, HARQ, processes for grant-free uplink transmissions. The network node includes a communication interface module for receiving from a wireless device a data transmission in a first time slot corresponding to a first PID under a first mapping. The communication interface module is further for transmitting a HARQ feedback signal indicating one of an acknowledgement, ACK, and a non-acknowledgement, NACK, associated with the first PID, according to whether the received data transmission is successfully decoded. When a NACK is transmitted, the communication interface module is for transmitting an indication of a second time slot for a retransmission, and for receiving retransmitted data corresponding to the first PID during the second time slot.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
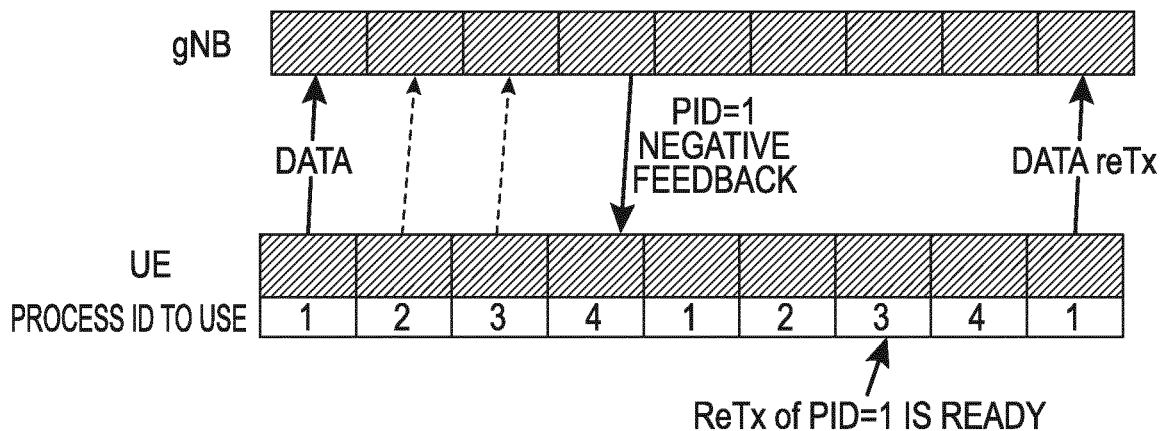
FIG. 1 is an illustration of a method supporting asynchronous HARQ by postponing the HARQ PID.
Figure 2:
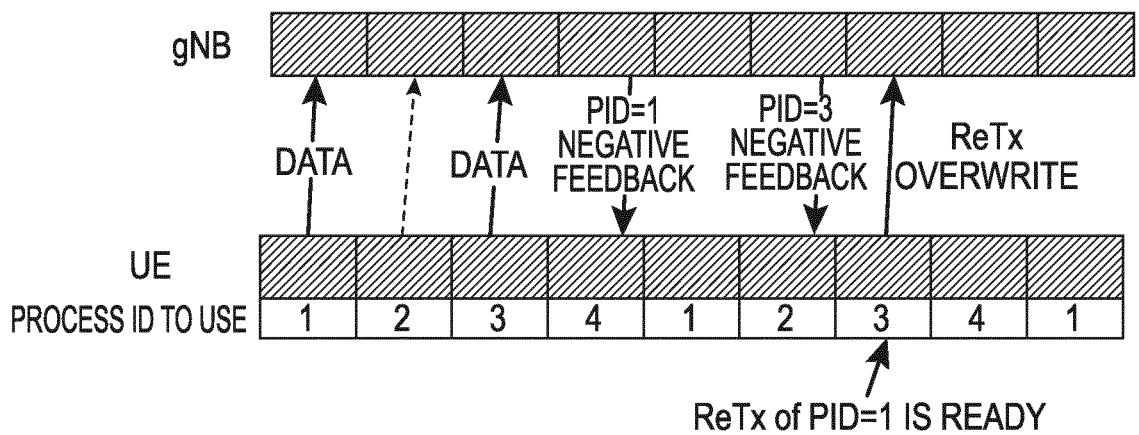
FIG. 2 is an illustration of a method supporting asynchronous HARQ by overwriting the HARQ PID.

The present disclosure provides methods, network nodes, and wireless devices configured to implement HARQ processes for grant-free UL access, i.e. UL transmission without dynamic scheduling/configured grant. The methods and arrangements described herein allow flexibility in the use of grant-free UL transmissions, so that the wireless device can transmit several new UL data packets before the network has scheduled the retransmission. The methods and arrangements disclosed herein also enable lower retransmission delays by enabling asynchronous UL retransmissions for grant-free access.

Embodiments disclosed herein describe ways to handle HARQ process IDs for grant-free UL access. As used herein, the term "grant-free" such as is used to refer to "grant-free uplink transmissions" refers to uplink transmission without dynamic scheduling and without a configured grant. In some embodiments an UL transmission is allocated a process ID which corresponds to a time slot. In one embodiment of the present disclosure, a downlink control information (DCI)-based HARQ feedback, along with corresponding HARQ PID, exchanges or intelligently changes the content or the indices of the pre-configured/pre-defined HARQ processes for certain slots. This provides the advantage that the UL retransmission can be made sooner than the predefined allocation which can improve the transmission rate. Since the embodiment allows the mapping to be at least temporarily swapped with another mapping, wherein the second time slot is not being used that instant, the semi-persistent scheduling or semi-static resource configuration can be adapted to perform retransmissions in a more efficient manner.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Examples of network nodes include, but are not limited to NodeB, base station (BS), multi-standard radio (MSR) radio node such as MSR BS, evolved node B (eNodeB), gNodeB (or gNB), macro evolved Node B (MeNB), small evolved Node B (SeNB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), mobile management entity (MME), etc.), operations & maintenance (O&M), open storage service (OSS), self-organizing network (SON), positioning node (e.g., evolved serving location center (E-SMLC)), minimizing of driving test (MDT), etc.

The non-limiting term "wireless device" as used herein, refers to any type of wireless device communicating with a network node and/or with another wireless device in a cellular or mobile communication system. Examples of wireless devices are user equipment (UE) such as an LTE UE, a Narrow Band-Internet of Things (NB-IoT) UE, a Vehicle-to-Vehicle (V2V) UE, a Vehicle-to-anything (V2X) UE, a UE of a particular category (e.g., UE category NB1, UE category M1, UE category 0, etc.), target device, device to device (D2D) wireless device, machine type wireless device or wireless device capable of machine to machine (M2M) communication, Personal Digital Assistant (PDA), Tablet, mobile terminals, smart phone, laptop embedded equipped (LEE) such as an embedded telematics unit in a vehicle (e.g. a truck, car, train, unmanned aerial vehicle), laptop mounted equipment (LME), Television (TV) apparatus, TV set-top box, Universal Serial Bus (USB) dongles, etc.

The ensuing discussion describes the disclosure in the terminology of new radio (NR), wherein, for example, a base station is termed a gNB, but similar techniques can be applied to LTE as well.

Figure 3:
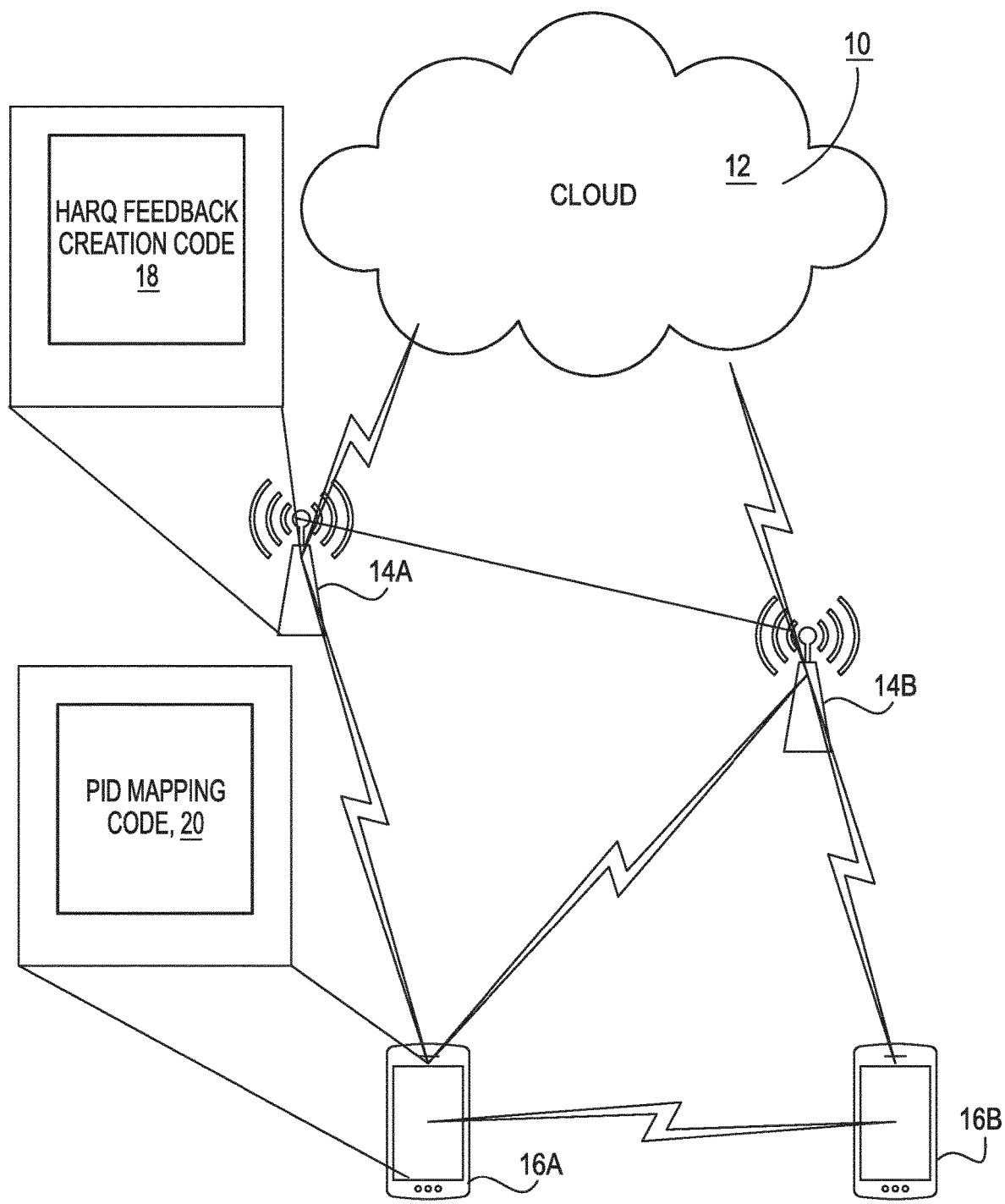
FIG. 3 is a block diagram of a wireless network constructed in accordance with principles set forth herein.

Returning to the drawing figures in which like elements are referred to by like reference numerals, there is shown in FIG. 3 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

As shown in FIG. 3, the network node 14 includes HARQ feedback creation code 18, i.e. computer program instructions, configured to generate ACK/NACK messages based on results of decoding attempts performed on uplink signals received from the wireless device 16. The wireless device 16 includes PID mapping code, i.e. computer program instructions, configured to exchange the slot mapped to a first PID with a slot mapped to a second PID.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

Figure 4:
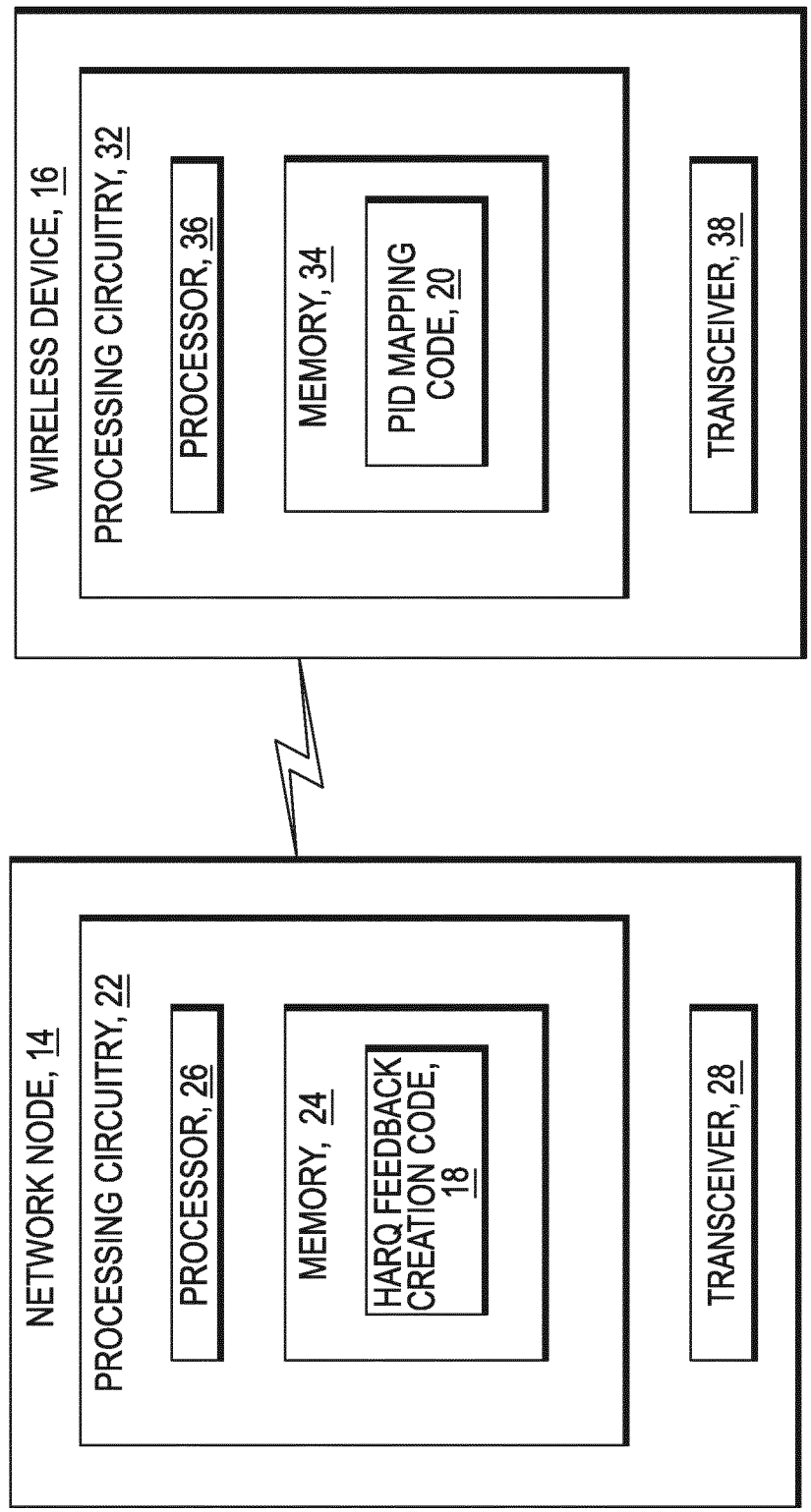
FIG. 4 is a block diagram of a network node and wireless device constructed in accordance with principles set forth herein.

FIG. 4 is a block diagram of an exemplary network node 14 in communication with an exemplary wireless device 16 over the wireless communication network 10. It is noted that the wireless communication network 10 may include any number of wireless devices 16, and any number of network nodes 14.

Network node 14 includes processing circuitry 22. Processing circuitry 22 includes a processor 26 and a memory 24, the memory 24 in communication with the processor 26. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processor 26 may be configured to access (e.g., write to and/or read from) memory 24, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code, i.e. computer program instructions, executable by processor 26 and/or other data, e.g., data pertaining to communication, e.g., configuration and/or address data of nodes, etc. Memory 24 also includes HARQ feedback creation code 18, (computer program instructions) the HARQ feedback relating to the data corresponding to a first PID. Memory 24 has instructions that, when executed by processor 26, configures processor 16 to perform the processes described herein. Network node 14 includes communication interface 28 configured to receive transmissions from the wireless device and transmit data to the wireless device. Such a communication interface may also be termed, for example, a transceiver.

Wireless device 16 includes processing circuitry 32. Processing circuitry 32 includes a processor 36 and a memory 34, the memory 34 in communication with the processor 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 32 may be configured to access (e.g., write to and/or read from) memory 34, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by processor 36 and/or other data, e.g., data pertaining to communication, e.g., configuration and/or address data of nodes, etc. Memory 34 also includes PID mapping code 20 (computer program instructions) configured to exchange the slot mapped to the first PID with a slot mapped to a second PID. Memory 34 has instructions that, when executed by processor 36, configures processor 36 to perform the processes described herein. Wireless device 16 includes communication interface 38 configured to receive transmissions from the network node and transmit data to the network node. Such a communication interface may also be termed, for example, a transceiver.

Figure 5:
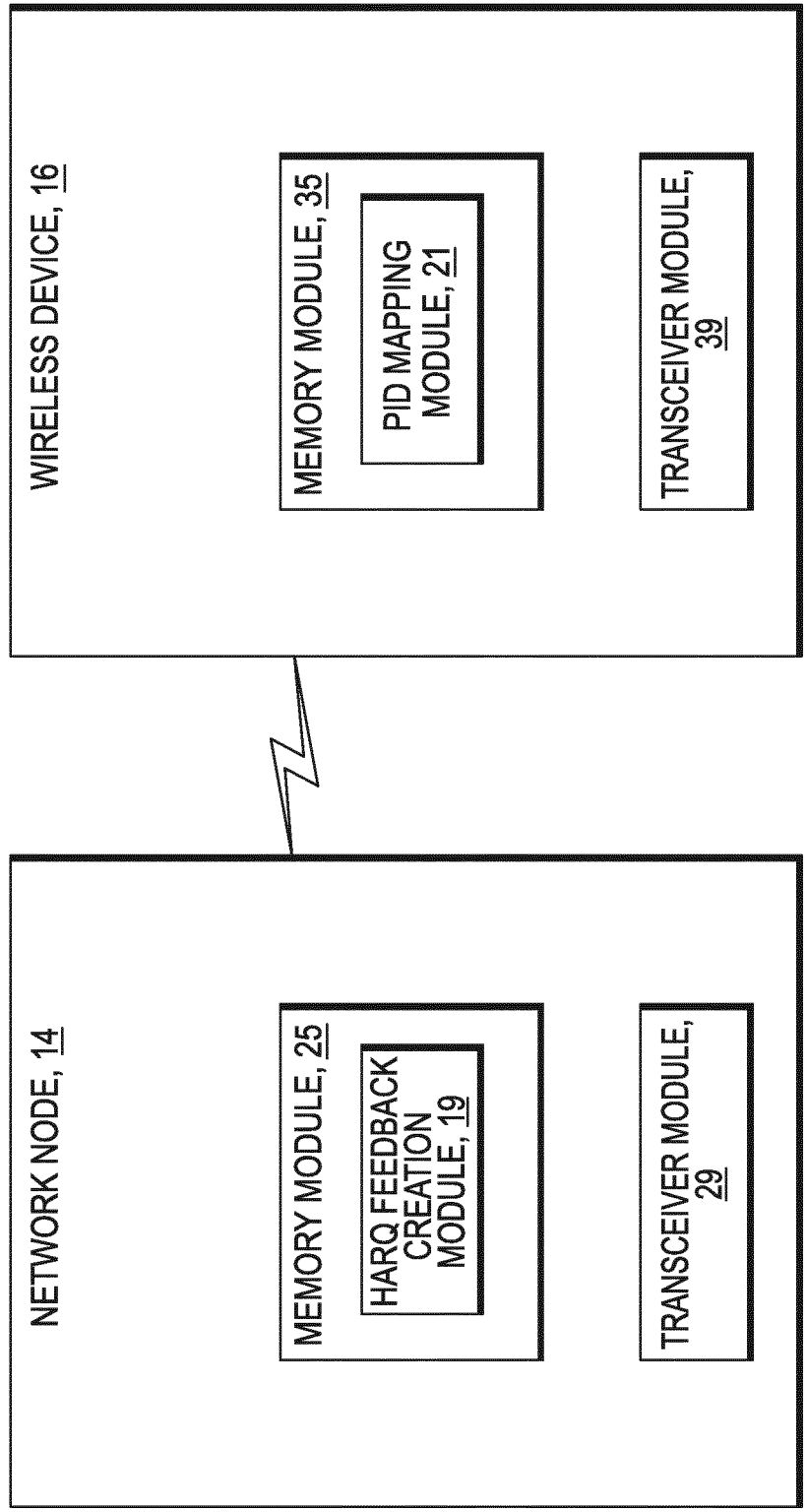
FIG. 5 is a block diagram of an alternative embodiment of a network node and wireless device constructed in accordance with principles set forth herein.

FIG. 5 illustrates an alternative embodiment of a network node 14 and wireless device 16 implemented at least in part by software executable by a processor. In the network node 14, the software stored in memory module 25 may include a HARQ feedback creation module 19, the HARQ feedback relating to the data corresponding to the first PID. The network node also includes a communication interface module 29, for receiving transmissions from the wireless device and for transmitting data to the wireless device. Such a communication interface may also be termed, for example, a transceiver. In the wireless device 16, the software stored in memory module 35 may include a PID mapping module 21 for exchanging the time slot mapped to the first PID with a time slot mapped to a second PID. Wireless device 16 also includes a communication interface module 39, for receiving transmissions from the network node and for transmitting data to the network node. Such a communication interface may also be termed, for example, a transceiver.

Although embodiments are described herein with reference to certain functions being performed by network node 14 and wireless device 16, it is understood that the functions can be performed in other network nodes and elements. It is also understood that the functions of the network node 14 and wireless device 16 can be distributed across the network cloud, such as the Internet or access network backhaul network, so that other nodes can perform one or more functions or even parts of functions described herein.

As explained above, in some embodiments, an UL transmission is allocated a process ID which corresponds to a time slot. In one embodiment, a downlink control information (DCI)-based HARQ feedback, along with a corresponding HARQ PID, exchanges or intelligently changes the content or the indices of the pre-configured/pre-defined HARQ processes for certain slots. This is achieved in some embodiments by at least temporarily swapping one mapping with another mapping, where an earlier time slot is not being used, so that the semi-persistent scheduling or semi-static resource configuration can be adapted to perform retransmissions in a more efficient manner.

In essence, in some embodiments, when a HARQ NACK is received at the wireless device and there is an earlier available time slot that the wireless device may use for retransmission of the non-acknowledged data that occurs before the statically defined time slot for retransmission, then the retransmission is performed in the earlier available time slot, and the transmission or non-transmission that would otherwise have occurred in the earlier available time slot is deferred to a later time slot. This provides the advantage that the wireless device is able to retransmit erroneously received data at an earlier time slot than when its semi-static resource configuration would normally allow.

This provides the advantage that the retransmission can be processed more quickly, resulting in an improved transmission rate.

Figure 6:
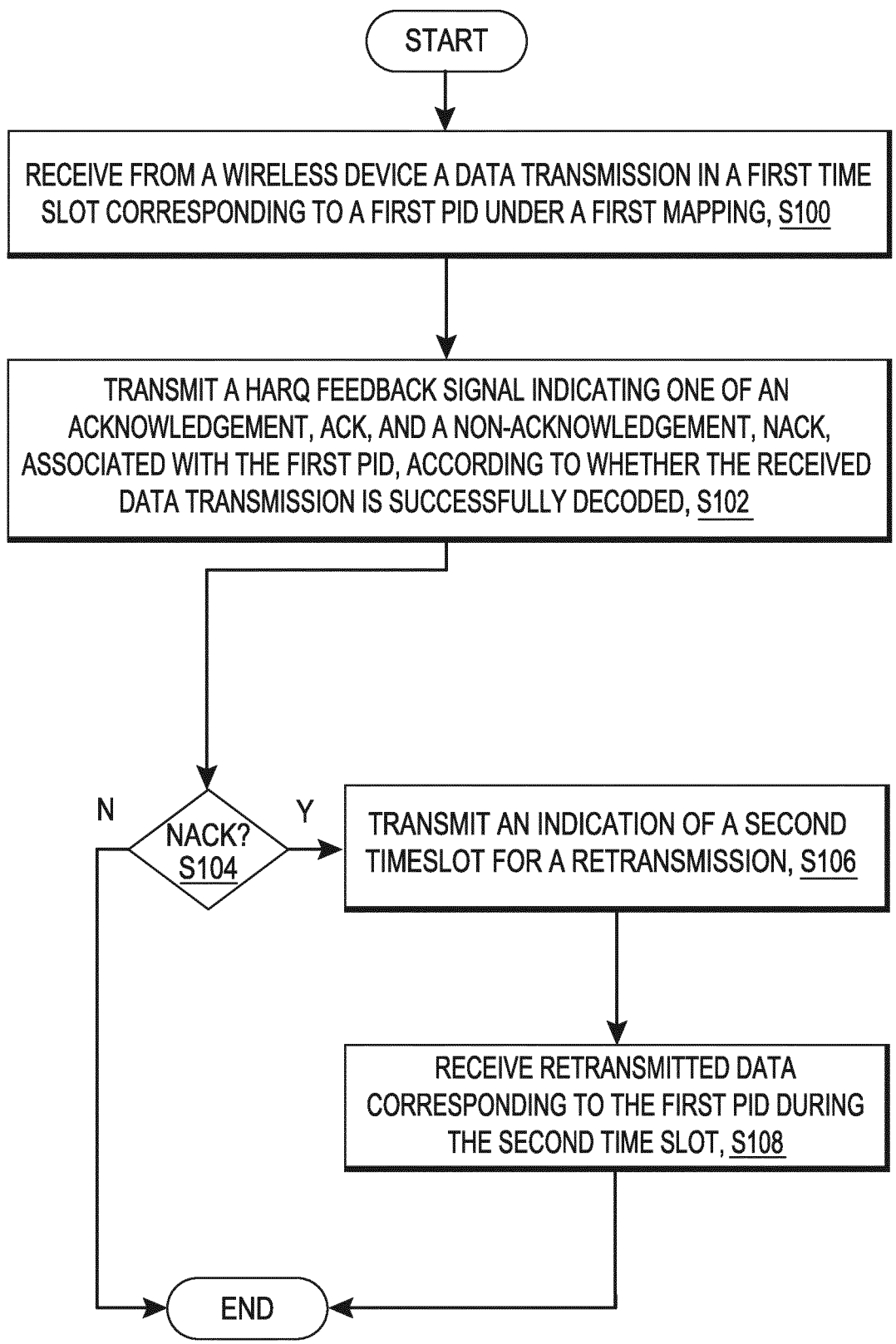
FIG. 6 is a flowchart of an exemplary process in a network node for managing HARQ processes for grant-free uplink transmission.

FIG. 6 is a flowchart of an exemplary process in a network node 14 for managing hybrid automatic repeat request, HARQ, processes for grant-free uplink transmissions. The process includes receiving via the communication interface 28, from a wireless device 16, a data transmission in a first time slot corresponding to a first PID under a first mapping (block S100). The process also includes transmitting, via the communication interface 28, a HARQ feedback signal indicating one of an acknowledgement, ACK, and a non-acknowledgement, NACK, associated with the first PID, according to whether the received data transmission is successfully decoded (block S102). If a NACK is sent, (block S104), the process includes transmitting, via the communication interface 28, an indication of a second time slot for a retransmission, the second time slot corresponding to a second PID according to a second mapping (block S106), and receiving, via the communication interface 28, retransmitted data corresponding to the first PID during the second time slot corresponding to the second PID (block S108). The semi-persistent scheduling/semi-static resource configuration for the UL transmissions can therefore be adapted for retransmission if an earlier time slot can be used than one which would normally be used/mapped for the UL transmission. This provides the advantage that retransmissions can be processed more quickly, resulting in an improved transmission rate.

Figure 7:
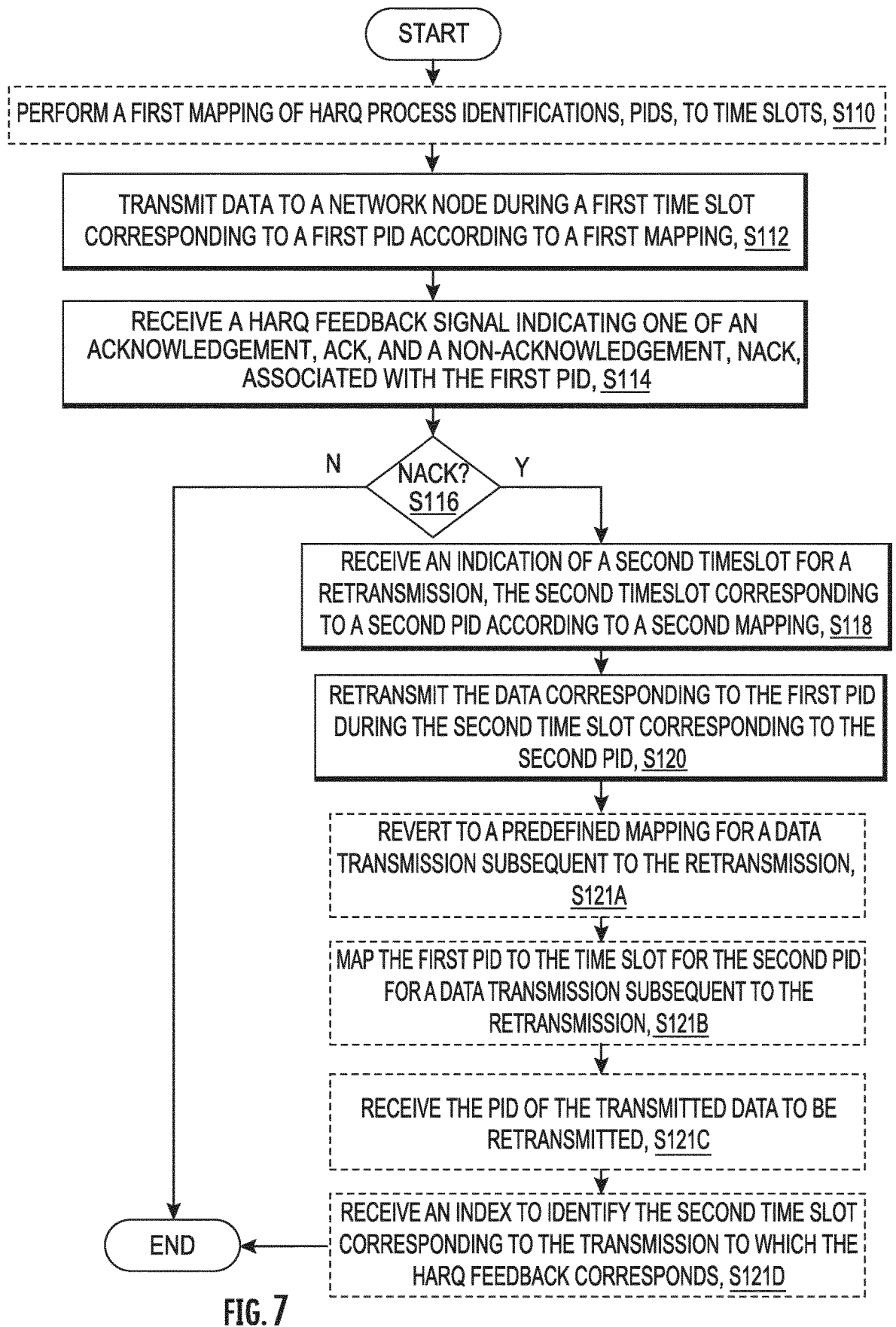
FIG. 7 is a flowchart of an exemplary process in a wireless device for managing HARQ processes for grant-free uplink transmissions

FIG. 7 is a flowchart of an exemplary process in a wireless device 16 for managing hybrid automatic repeat request, HARQ, processes for grant-free uplink transmissions, the uplink transmission being allocated process identifications, PIDs, which have predefined mappings to time slots. The process optionally includes performing, via PID mapping code (computer program instructions) 20, a first mapping of a HARQ process identifications to time slots (block S110). The process includes transmitting, via the communication interface 38, data to a network node 14 during a first time slot corresponding to a first PID according to a first mapping (block S112). The process also includes receiving, via the communication interface 38, a HARQ feedback signal indicating one of an acknowledgement, ACK, and a non-acknowledgement, NACK, associated with the first PID (block S114). If a NACK is received, (block S116), the process includes receiving, via the communication interface 38, an indication of a second time slot for a retransmission, the second time slot corresponding to a second PID according to a second mapping (block S118), and retransmitting, via the communication interface 38, the data corresponding to the first PID during the second time slot corresponding to the second PID (block S120). This provides the advantage that the wireless device is able to retransmit erroneously received data at an earlier time slot than when its semi-static resource configuration would normally allow. This provides the advantage that the retransmission can be processed more quickly, resulting in an improved transmission rate. Optionally, the process also includes reverting to a predefined mapping for a data transmission subsequent to the retransmission (block S121A). Optionally, the process also includes mapping the first PID to the time slot for the second PID for a data transmission subsequent to the retransmission (block S121B). Optionally, the process also includes receiving the PID of the transmitted data to be retransmitted (block S121C). Optionally, the process also includes receiving an index to identify the second time slot corresponding to the transmission to which the HARQ feedback corresponds (block S121D).

Figure 8:
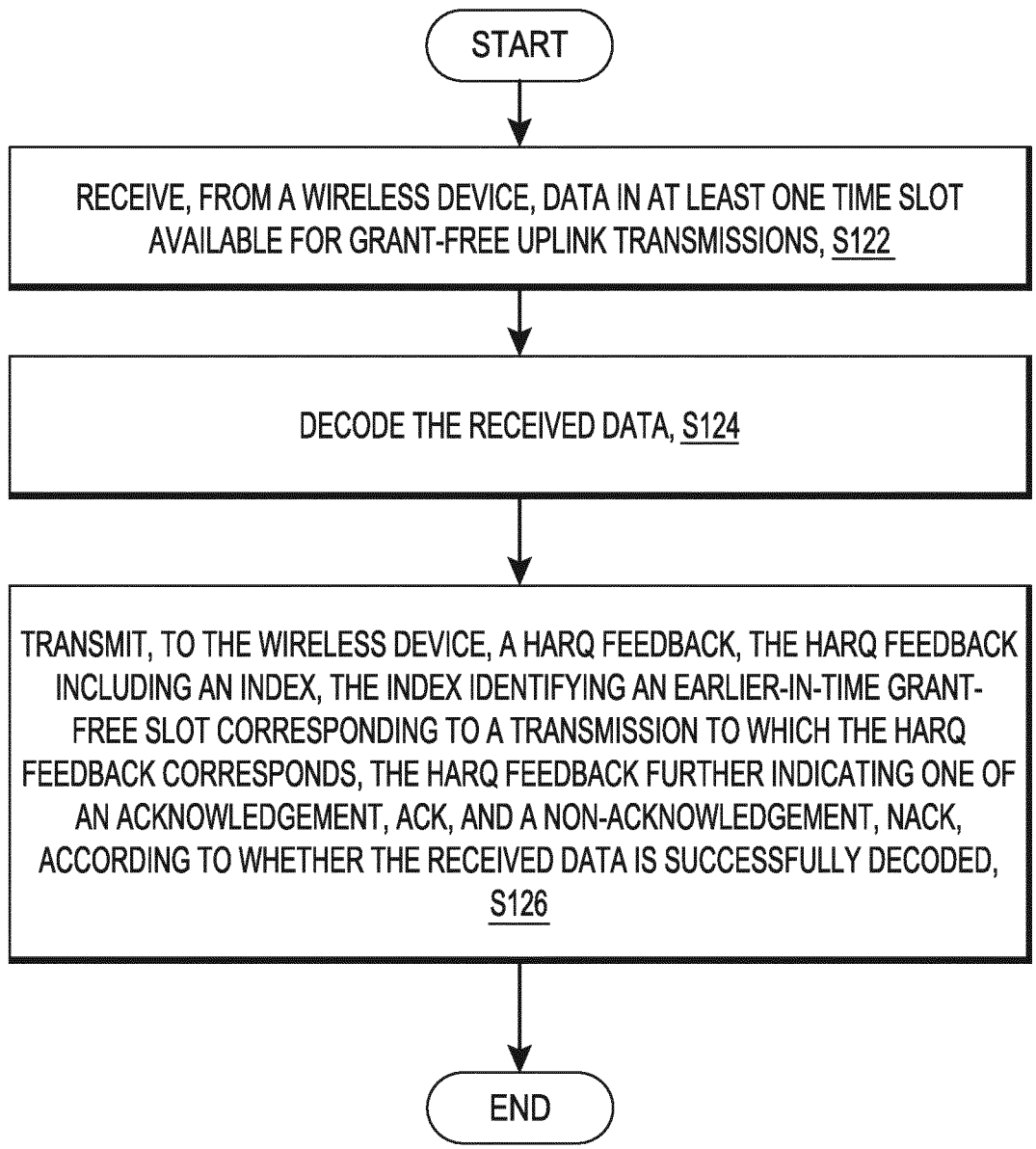
FIG. 8 is a flowchart of an alternative exemplary process in a network node for managing HARQ processes for grant-free uplink transmission.

FIG. 8 is a flow chart of an alternative process in a network node 14 for managing hybrid automatic repeat request, HARQ, processes for grant-free uplink transmissions. The process includes receiving, via the communication interface 28 and from a wireless device 16, data in at least one time slot available for grant-free uplink transmissions (block S122). The process also includes decoding, via the processor 26, the received data (block S124). The process further includes transmitting, via the communication interface 28, to the wireless device 16 a HARQ feedback, the HARQ feedback including an index, the index identifying an earlier in time grant free slot corresponding to a transmission to which the HARQ feedback corresponds. The HARQ feedback further indicates one of an ACK and a NACK according to whether the received data is successfully decoded (block S126). This enables the network node to indicate in which time slot the UL retransmission should occur whilst referring to the UL transmission wherein the semi-static resource configuration is made without allocation of a process ID, for example, to preconfigure the mapping of UL transmissions to time slots. The advantage is that the UL transmissions can still be performed without dynamic scheduling, i.e. grant free, but the retransmissions can be made as soon as a possible to improve the efficiency and transmission rate.

Figure 9:
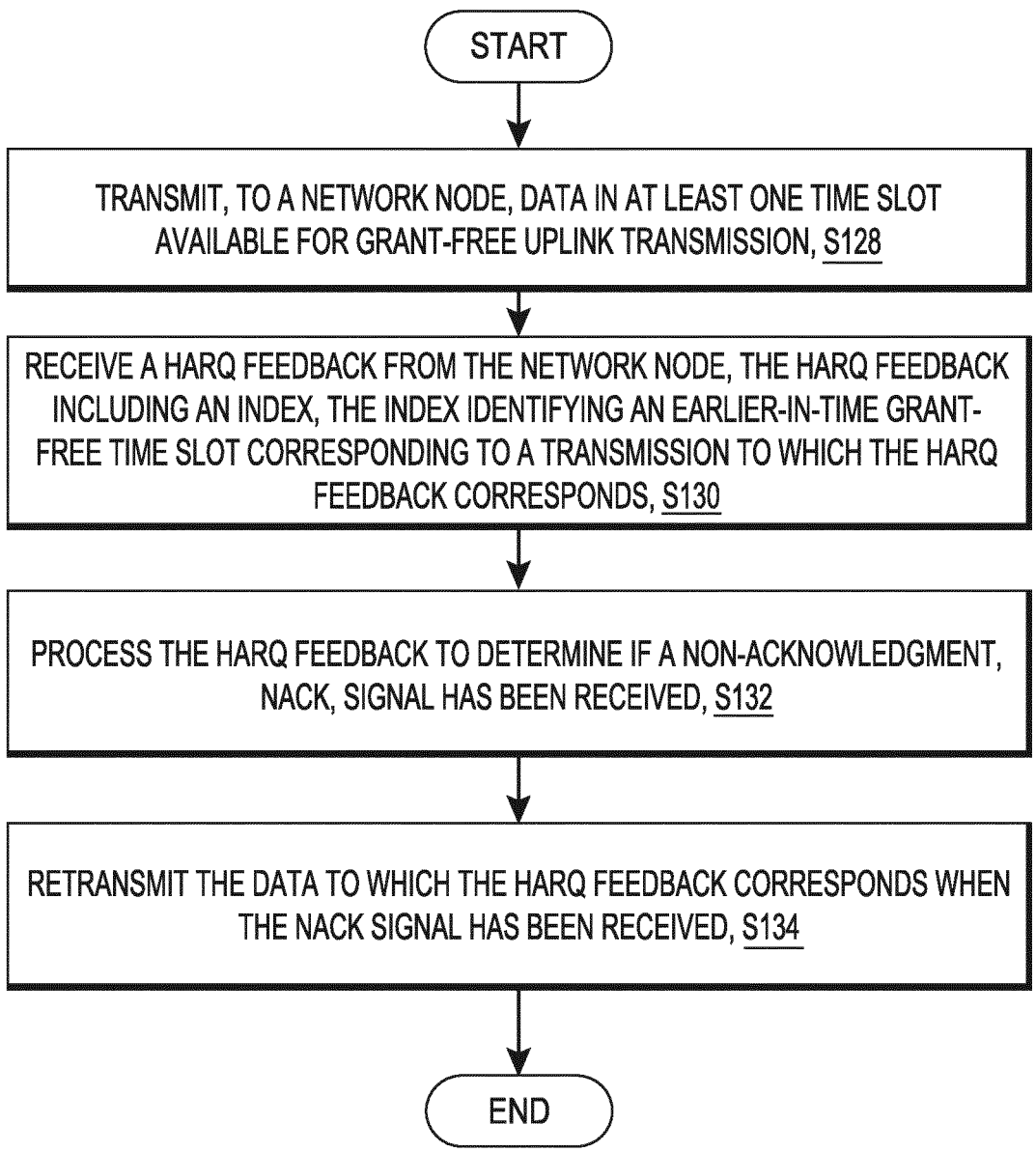
FIG. 9 is a flowchart of an alternative exemplary process in a wireless device for managing HARQ processes for grant-free uplink transmissions.

FIG. 9 is a flowchart of an exemplary process in a wireless device 16 for managing hybrid automatic repeat request, HARQ, processes for grant-free uplink transmissions, the uplink transmission being allocated process identifications, PIDs, which have predefined mappings to time slots. The process includes transmitting, via the communication interface 38, to a network node 14, data in at least one time slot available for grant-free uplink transmission (block S128). The process also includes receiving, via the communication interface 38, a HARQ feedback from the network node, the HARQ feedback including an index, the index identifying an earlier in time grant free time slot corresponding to a transmission to which the HARQ feedback corresponds (block S130). The process also includes processing, via the processor 36, the HARQ feedback to determine if a NACK signal has been received (block S132). The process further includes retransmitting, via the communication interface 38, the data to which the HARQ feedback corresponds when the NACK signal has been received (block S134). This wireless device is therefore able to perform a re-transmission in a time slot indicated by the network node which also refers to the time slot of the erroneous UL transmission wherein the semi-static resource configuration is made without allocation of a process ID, for example, to preconfigure the mapping of UL transmissions to time slots. The retransmission may be made sooner than the time slot of the semi-static allocation which has the advantage the retransmissions can be made as soon as a possible to improve the efficiency and transmission rate but without dynamic scheduling, i.e. grant free.

According to one embodiment, the network node 14 and the wireless device 16 maintain a synchronization of the PIDs used for any grant-free UL transmission. According to this embodiment, initially, HARQ PIDs can be synchronized in a manner similar to LTE where the HARQ PIDs are calculated from the slot/TTI/subframe number. However, the pre-configured or pre-defined synchronization rule can be over-written and changed accordingly based on asynchronous HARQ feedback. As explained above, in some embodiments, when a HARQ NACK is received at the wireless device and there is an earlier available time slot that the wireless device may use for retransmission of the non-acknowledged data that occurs before the statically defined time slot for retransmission, then the retransmission is performed in the earlier available time slot. Different alternatives for swapping or changing rules for HARQ PIDs to achieve this earlier retransmission are explained in the associated embodiments below and illustrated in the figures.

Figure 10:
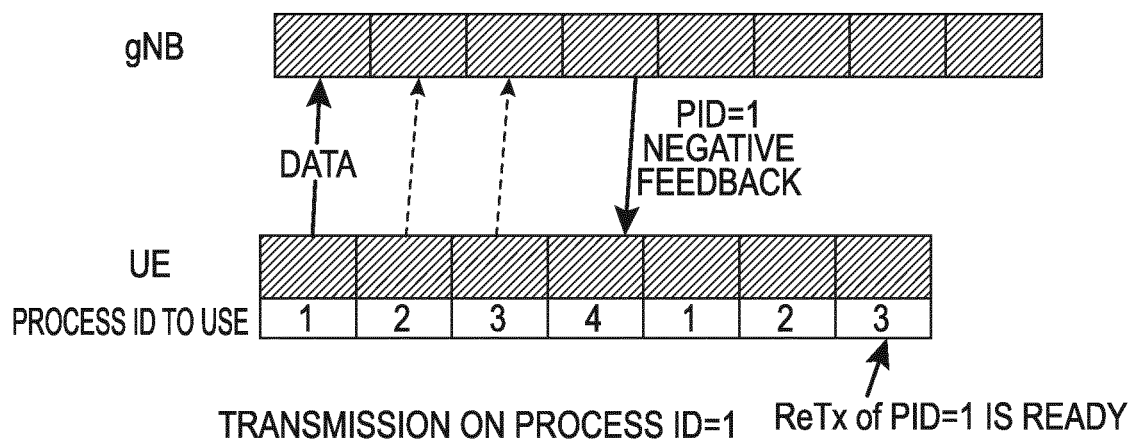
FIG. 10 is a diagram of a transmission process when a NACK results in a HARQ process according to one embodiment.

In the embodiment illustrated in FIG. 10, there are two data transmissions on the pre-allocated PID 1 and PID 3. After the two transmissions, the network node 14 signals back to the wireless device 16 that data in PID=1 needs a retransmission. The timing for this retransmission is such that the retransmission ends up being allocated in in the slot corresponding to PID 3.

According to one embodiment, the new mapping of PIDs to a slot/TTI/subframe number is implicitly known at the network node 14 and the wireless device 16, e.g. it is the pre-defined or pre-configured mapping for the PIDs which are not swapped and the new PID/time slot for the swapped PIDs. This is implicitly known by predefining the new mapping in both the network node 14 and the wireless device 16. The new mapping can also be explicitly signaled by the network node 14 to the wireless device 16, after the detection of certain events (e.g., loss of synchronization detected by the network node 14) or when a grant-based PID is to be prioritized over pre-defined grant-free PIDs. In the implicit case embodiment, both the network node 14 and the wireless device 16 can start following the new rule for PID mapping. For the explicit case embodiment, the network node 14 can signal, via its communication interface 28, the new rule or mapping using either L1 or L2 control signaling, or using radio resource control (RRC) signaling.

Figure 11:
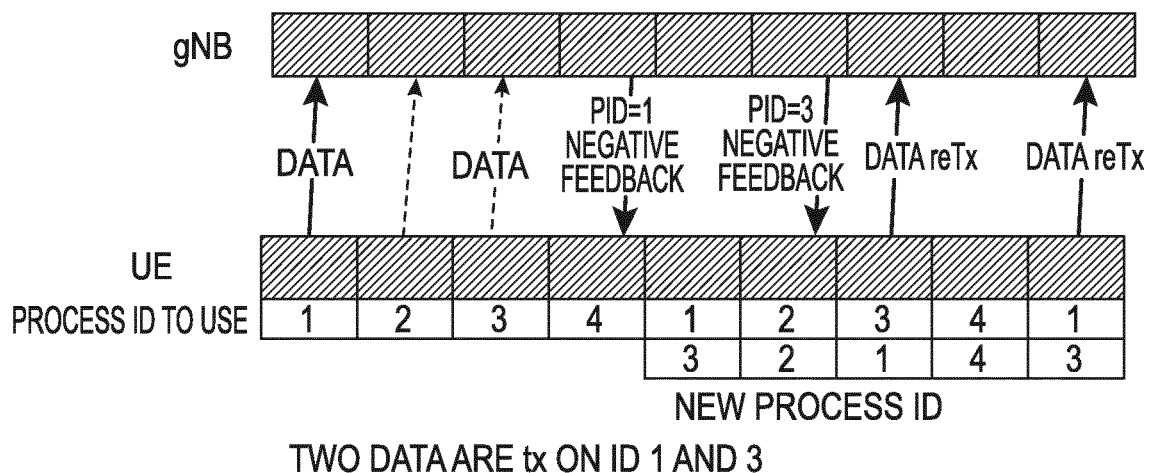
FIG. 11 is a diagram of a transmission process when a NACK results in a HARQ process according to another embodiment.

According to another embodiment as shown in FIG. 11, the pre-configured or pre-defined slot/SF/TTI number mapping for PID=1 and PID=3 is temporarily exchanged or swapped so that wireless device 16 can re-transmit the data as PID=1 while maintaining the buffer for PID=3. This means that the PID of the process is not changed and is kept throughout subsequent retransmissions. Note that in one of the steps of this embodiment, the buffer for PID=3 is not over-written as described in the prior art.

The newly swapped PID cannot currently be in use according to the internal state of the network node 14. In addition, the newly swapped PID is not expected to be in use by the wireless device 16 taking into account the network node 14 processing time and transmission time. An example is that the data of the PID is still being wirelessly transmitted or has not yet been processed by the network node 14.

Furthermore, a rule can be defined at the wireless device 16 not to transmit the new data unless the feedback has been received for that PID. For instance, the wireless device 16 can avoid sending PID 1 (as shown in FIG. 1) in its pre-defined slot/TTI/subframe since it has not yet received and decoded the HARQ feedback for PID 1. Thus, in this embodiment, the grant-based PID (in the DCI) overrides the slot/TTI/SF number-based pattern, and the same PID is maintained, i.e., the synchronized predefined time slots and their corresponding PIDs are used for subsequent transmissions.

In an alternate embodiment, the PID of the process is permanently changed at the point of retransmission according to the slot/subframe pattern. In the example shown in FIG. 10, the retransmission of PID=1 is moved to PID=3 starting from the retransmission. Conversely, the process in the now-taken PID=3 is moved to the now-freed-up PID=1. In essence, this embodiment of the present disclosure describes the scenario where the slot/TTI/SF number-based pattern overrides the grant-based PID, and the PID is changed at the point of retransmission, and the configuration where the slots have been swapped or exchanged is maintained for future transmissions.

Figure 12:
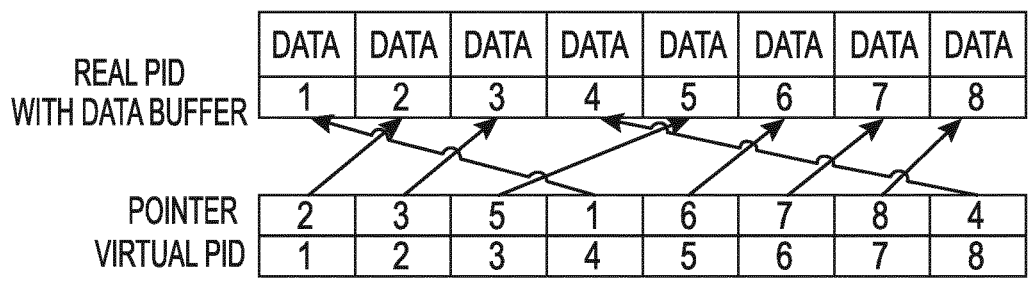
FIG. 12 is a diagram of mapping between real and virtual PIDs.

As shown in FIG. 12, in another embodiment, the method described herein can be implemented as a mapping between real PIDs and virtual PIDs. Both the network node 14 and the wireless device 16 use the same algorithm to decide a known sequence of virtual PIDs to use for each grant-free UL transmission. Alternately, the virtual PID can be seen as a mapping from the slot/subframe number. This virtual PID then stores a pointer to the actual PID and its data. In the following example, according to the algorithm, if the virtual PID=3 is used for UL transmission, the data in the process PID=5 would be transmitted instead, according to the pointer. Once it is determined that an exchange or swapping is required, i.e., from the DCI sent by the network node 14 that includes a negative acknowledgement (NAK) and new UL grant, both the wireless device 16 and the network node 14 need only to change the pointer to implement the exchange.

Figure 13:
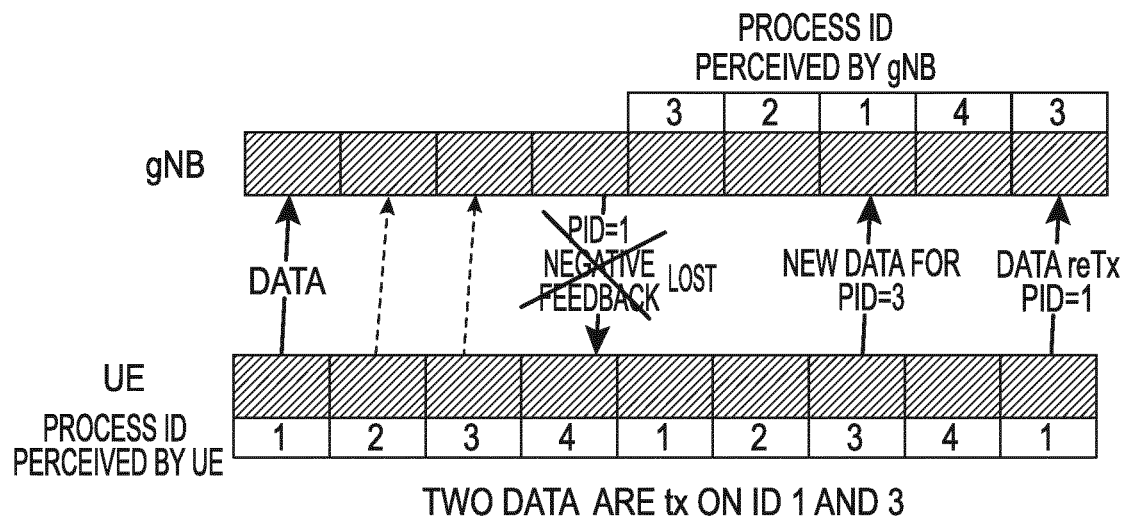
FIG. 13 is a diagram of a transmission process when a NACK results in a HARQ process according to yet another embodiment.

FIG. 13 illustrates another embodiment of the present disclosure. In this embodiment, UL data is detected at network node 14 but it is decoded unsuccessfully. A NACK message is sent by network node 14 to wireless device 16 but this NACK (or an explicit signal used to change the mapping rule for HARQ PIDs) is lost. The result is a mismatch between wireless device 16 and network node 14. Such errors rarely happen since the DL NACK is more reliable than UL data transmission, and moreover, this can be recovered by a higher-layer. Nevertheless, this embodiment solves this error case in the lower layers. In every grant-free UL transmission, one indicator is used to indicate whether this is a new transmission or a retransmission. This embodiment, as discussed below, shows that both sides can be kept in synchronization.

If an exchange or swapping of PID position is not required, both sides are still in synchronization. The wireless device 16 retransmits on the same grant-free HARQ process and the base station 14 expects a retransmission there. If an exchange or swapping of PIDs positions does occur, base station 14 expects a retransmission on the newly assigned position. If nothing happens in the newly assigned position or transmission is signaled with new data, the base station 14 is aware that the synchronization is lost and goes back to the previous synchronization state.

Alternatively, the PIDs of the processes are exchanged (according to the "permanent" exchange embodiment described above) only if the pre-configured transmission opportunity for the taken-over PID (i.e., PID 3 in the above example) is before or within a certain pre-defined time interval, e.g., the round-trip time (RTT). Otherwise, the taken-over PID may be simply be dropped temporarily.

Alternatively, instead of swapping the PIDs, the slot/TTI/SF number-based pattern can be delayed by one slot/TTI/SF counter each time a certain event is detected, e.g., when the grant-based PID is to be prioritized. In other words, a counter of, e.g., "1 slot/TTI/SF" may be added in the PIDs mapping formula to calculate the PID sequence depending on the slot/TTI/SF, each time the grant-based PID needs to be prioritized. Furthermore, there can be an upper limit on the counter for delaying the PID sequence.

Backward Pointing in Time

Figure 14:
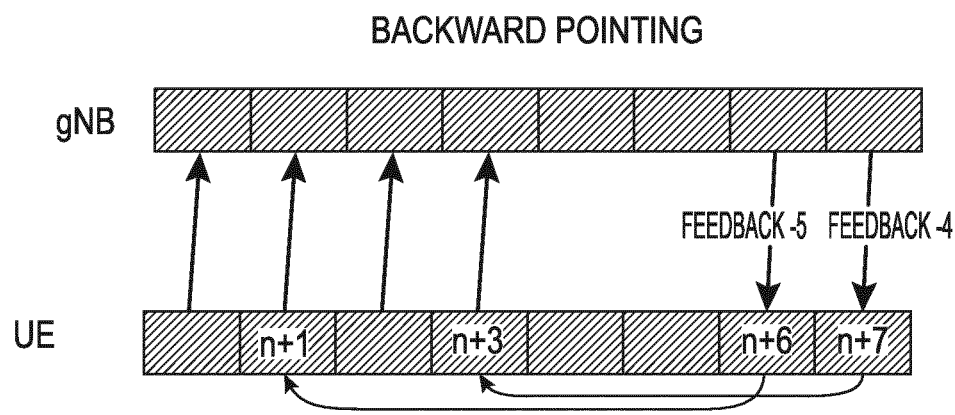
FIG. 14 is a diagram of relating HARQ processes via an indexing scheme.

According to another embodiment of the present disclosure, illustrated in FIG. 14, in every HARQ feedback DCI for grant-free data, there may be an index to an earlier time period (in the number of slots/TTIs/SFs) indicating which UL transmission the HARQ feedback refers to. In the example shown in FIG. 14, the two feedback signals are received in time n+6, and time n+7, respectively. According to the index in each HARQ feedback (−5 and −4, respectively), the first HARQ feedback refers to the UL transmission in time n+1 (i.e., n+6−5=1) and the second HARQ feedback refers to the UL transmission in time n+3 (i.e., n+7−4=3).

In another embodiment, the process index field in the HARQ feedback DCI is configured or defined so that it ranges from a shortest feedback time to a longest feedback time, thus having a limited range so that it can be carried by fewer bits. As one example, four indices can point at 2, 3, 4, 5 slots/TTIs/SFs earlier in time.

In another embodiment, the indices can point at certain time windows counting from the time of the DCI (n). For example, index 1 can point to a transmission occurring in slot n-2 or n-3 for n slot/TTI/SF. The wireless device 16 is thereby restricted to not initiate more than one grant-free transmission per time window.

In another embodiment, the index points at past grant-free occasions. As an example, if the grant-free period is S slots, index 0 can point to the most recent past occasion, index 1 can point to the occasion S slots before that, etc.

In another embodiment, the wireless device 16 identifies or numbers the grant-free processes starting from 0 to a maximum number of processes, i.e., N, in order of appearance of the new UL data.

In one embodiment, upon receiving a DCI for retransmission of a grant-free process, the process is moved to a grant-based HARQ process index. The feedback/scheduling for the grant-free transmission therefore performs the following two tasks: (1) the first task indicates which past "grant-free process" should be retransmitted; and (2) the second task indicates which "grant-based HARQ process index" this "grant-free process" should be referred to.

In one embodiment, two DCI messages are sent to the wireless device 16, where the first message is identified as a "grant-free DCI" message and indicates the process to retransmit, and the second message is identified as a "grant-based DCI" message and indicates the grant-based HARQ process index. A wireless device 16 receiving both messages in the same TTI retransmits the indicated grant-free process in the indicated resources of the "grant-based DCI."

In another embodiment, the grant-free process and the grant-based HARQ process index is indicated in the same message identified as a "grant-free DCI" message. A combined index is used to give the information via a larger PID field. Alternatively, a smaller PID field is combined with another field in the DCI, e.g., the new data indicator (NDI) or the modulation and coding scheme (MCS) fields. The table below is used for the following example.

TABLE 1

Combined index for grant-free retransmission.

|  |  | Index Mi | | | |
| --- | --- | --- | --- | --- | --- |
|  |  | 0 | 1 | 2 | 3 |
| Index I |  |  |  |  |  |
| Index Ni | 0 | 0 | — | 1 | — |
|  | 1 | — | 2 | — | 3 |
|  | 2 | 4 | — | 5 | — |
|  | 3 | — | 6 | — | 7 |

As an example, consider N=4 possible time-windows with separate grant-free processes of index Ni, and M=4 HARQ processes for grant-based operation of index Mi. A combined index I can then be of length N*M, covering all combinations. Alternatively, a subset of the combinations is schedulable by the network, as in Table 1, with 8 combinations corresponding to 3-bit information. In this way, all information can be given to the wireless device 16 with low signaling overhead. The network can schedule with different options of HARQ processes, depending on which processes are already in use. If all schedulable processes are occupied, the network node 14 can send the feedback at a later time.

Thus, in some embodiments, a method performed by a wireless device 16 for managing hybrid automatic repeat request, HARQ, processes for grant-free uplink transmissions, the uplink transmission being allocated process identifications, PIDs, which have predefined mappings to time slots is provided. The method includes transmitting data to a network node 14 during a first time slot corresponding to a first PID according to a first mapping (block S112). The method further includes receiving a HARQ feedback signal indicating one of an acknowledgement, ACK, and a non-acknowledgement, NACK, associated with the first PID (block S114). When a NACK is received, the method includes receiving an indication of a second time slot for a retransmission (block S118), and retransmitting the data corresponding to the first PID during the second time slot (block S120).

According to this aspect, in some embodiments, the second time slot corresponds to a second PID according to a second mapping, the data corresponding to the first PID being retransmitted corresponding to the second PID. In some embodiments, the method further includes reverting to a previous mapping for a data transmission subsequent to the retransmission (block S121A). In some embodiments, the method further includes mapping the first PID to the time slot for the second PID for a data transmission subsequent to the retransmission (block S121B). In some embodiments, the second mapping is maintained for a predetermined time interval. In some embodiments, both the first and second mappings are known to the network node 14. In some embodiments, the second mapping includes exchanging a time slot mapped to the first PID under the first mapping for a time slot mapped to a second PID under the first mapping. In some embodiments, exchanging occurs only if a transmission opportunity for the retransmission occurs before a predetermined time. In some embodiments, the second mapping includes delaying a sequence of PIDs by at least one time slot. In some embodiments, the method further includes receiving the PID of the transmitted data to be retransmitted (block S121C). In some embodiments, the method further includes receiving an index to identify the second time slot corresponding to the transmission to which the HARQ feedback corresponds (block S121D). In some embodiments, the index provides an indication of earlier-in-time grant-free slot groupings. In some embodiments, the HARQ feedback further includes a notification of a PID with which a grant-free process is to be retransmitted as a grant-based transmission. In some embodiments, the HARQ feedback and the notification of the PID with which the grant-free process is to be retransmitted as a grant-based transmission are sent as separate messages. In some embodiments, the predefined mapping is one of temporary and permanent.

According to another aspect, in some embodiments, a wireless device 16 for managing hybrid automatic repeat request, HARQ, processes for grant-free uplink transmissions, the uplink transmission being allocated process identifications, PIDs, which have predefined mappings to time slots is provided. The wireless device 16 includes a communication interface 38 configured to transmit data to a network node 14 during a first time slot corresponding to a first PID according to a first mapping. The communication interface is also configured to receive a HARQ feedback signal indicating one of an acknowledgement, ACK, and a non-acknowledgement, NACK, associated with the first PID. When a NACK is received, the communication interface is configured to receive an indication of a second time slot for a retransmission, and retransmit the data corresponding to the first PID during the second time slot.

According to this aspect, in some embodiments, the second time slot corresponds to a second PID according to a second mapping, the data corresponding to the first PID being retransmitted corresponding to the second PID. Inn some embodiments, the processing circuitry is further configured to revert to the predefined mapping for a data transmission subsequent to the retransmission. In some embodiments, the processing circuitry is further configured to map the first PID to the time slot for the second PID for a data transmission subsequent to the retransmission. In some embodiments, the second mapping is maintained for a predetermined time interval. In some embodiments, both the first and second mappings are known to the network node 14. In some embodiments, the second mapping includes exchanging a time slot mapped to the first PID under the first mapping for a time slot mapped to a second PID under the first mapping. In some embodiments, exchanging occurs only if a transmission opportunity for the retransmission occurs before a predetermined time. In some embodiments, the second mapping includes delaying a sequence of PIDs by at least one time slot. In some embodiments, the communication interface 38 is further configured to receive the PID of the transmitted data to be retransmitted. In some embodiments, the communication interface 38 is further configured to receive an index to identify the second time slot corresponding to the transmission to which the HARQ feedback corresponds. In some embodiments, the index provides an indication of earlier-in-time grant-free slot groupings. In some embodiments, the HARQ feedback further includes a notification of a PID with which the grant-free process is to be retransmitted as a grant-based transmission. In some embodiments, the HARQ feedback and the notification of the process ID with which the grant-free process is to be retransmitted as a grant-based transmission are sent as separate messages. In some embodiments, the predefined mapping is one of temporary and permanent.

According to another aspect, a wireless device 16 for managing hybrid automatic repeat request, HARQ, processes for grant-free uplink transmissions is provided. The wireless device includes a communication interface module 39 for transmitting data to a network node 14 during a first time slot corresponding to a first PID. The communication interface module 39 is also for receiving a HARQ feedback signal indicating one of an acknowledgement, ACK, and a non-acknowledgement, NACK, associated with the first PID. When a NACK is received, the communication interface is further configured to receive an indication of a second time slot for a retransmission, and retransmit the data corresponding to the first PID during the second time slot.

According to yet another aspect, a method performed by a network node 14 for managing hybrid automatic repeat request, HARQ, processes for grant-free uplink transmissions is provided. The method includes receiving, from a wireless device 16, a data transmission in a first time slot corresponding to a first PID under a first mapping (block S100). The method further includes transmitting a HARQ feedback signal indicating one of an acknowledgement, ACK, and a non-acknowledgement, NACK, associated with the first PID, according to whether the received data transmission is successfully decoded (block S102). When a NACK is transmitted the method includes transmitting an indication of a second time slot for a retransmission (block S106). The method also includes receiving retransmitted data corresponding to the first PID during the second time slot (block S108).

According to this aspect, in some embodiments, the second time slot corresponds to a second PID according to a second mapping, the data corresponding to the first PID being retransmitted corresponding to the second PID. In some embodiments, both the first and second mappings are known to the wireless device 16. In some embodiments, the received retransmitted data contains an index identifying the data as retransmitted data.

According to another aspect, a network node 14 for managing hybrid automatic repeat request, HARQ, processes for grant-free uplink transmissions is provided. The network node includes a communication interface 28 configured to receive from a wireless device 16 a data transmission in a first time slot corresponding to a first PID under a first mapping. The communication interface 28 is further configured to transmit a HARQ feedback signal indicating one of an acknowledgement, ACK, and a non-acknowledgement, NACK, associated with the first PID, according to whether the received data transmission is successfully decoded. When a NACK is transmitted the communication interface transmits an indication of a second time slot for a retransmission and receives retransmitted data corresponding to the first PID during the second time slot.

According to this aspect, in some embodiments, the second time slot corresponds to a second PID according to a second mapping, the data corresponding to the first PID being retransmitted corresponding to the second PID. In some embodiments, both the first and second mappings are known to the wireless device 16. In some embodiments, the received retransmitted data contains an index identifying the data as retransmitted data.

According to yet another aspect, a network node 14 for managing hybrid automatic repeat request, HARQ, processes for grant-free uplink transmissions. The network node includes a communication interface module 29 for receiving from a wireless device 16 a data transmission in a first time slot corresponding to a first PID under a first mapping. The communication interface module 29 is further for transmitting a HARQ feedback signal indicating one of an acknowledgement, ACK, and a non-acknowledgement, NACK, associated with the first PID, according to whether the received data transmission is successfully decoded. When a NACK is transmitted, the communication interface module 29 is for transmitting an indication of a second time slot for a retransmission, and receives retransmitted data corresponding to the first PID during the second time slot.

Example Embodiments Include

Embodiment 1

A method, in a wireless device, for managing hybrid automatic repeat request (HARQ) processes for grant-free uplink access, the method comprising:

synchronizing, with a network node, predefined slots to be mapped to corresponding process identifications (PIDs) for grant-free uplink transmissions;

transmitting, to the network node, data corresponding to a first PID in a slot mapped to the first PID;

receiving a HARQ feedback from the network node, the HARQ feedback relating to the data corresponding to the first PID;

exchanging the slot mapped to the first PID with a slot mapped to a second PID; and retransmitting, to the network node, the data corresponding to the first PID in the slot mapped to the second PID.

Embodiment 2

The method of Embodiment 1, further comprising reverting to the synchronized predefined slots and their corresponding PIDs for subsequent retransmissions.

Embodiment 3

The method of Embodiment 1, further comprising maintaining configuration of the exchanged slots for subsequent retransmissions.

Embodiment 4

The method of Embodiment 3, wherein maintaining the configuration of the exchanged slots for subsequent retransmissions occurs only within a predetermined time interval.

Embodiment 5

A wireless device configured to manage hybrid automatic repeat request (HARQ) processes for grant-free uplink access, the wireless device comprising:

processing circuitry including a memory and a processor, the memory in communication with the processor, the memory having instructions that, when executed by the processor, configure the processor to:

synchronize, with a network node, predefined slots to be mapped to corresponding process identifications (PIDs) for grant-free uplink transmissions; and a communication interface configured to:

transmit, to the network node, data corresponding to a first PID in a slot mapped to the first PID; and receive a HARQ feedback from the network node, the HARQ feedback relating to the data corresponding to the first PID, the processor further configured to:

exchange the slot mapped to the first PID with a slot mapped to a second PID; and instruct the communication interface to retransmit, to the network node, the data corresponding to the first PID in the slot mapped to the second PID.

Embodiment 6

The wireless device of Embodiment 5, wherein the processor is further configured to revert to the synchronized predefined slots and their corresponding PIDs for subsequent retransmissions.

Embodiment 7

The wireless device of Embodiment 5, wherein the processor is further configured to maintain configuration of the exchanged slots for subsequent retransmissions.

Embodiment 8

The wireless device of Embodiment 7, wherein maintaining the configuration of the exchanged slots for subsequent retransmissions occurs only within a predetermined time interval.

Embodiment 9

A method, in a network node, for managing hybrid automatic repeat request (HARQ) processes for grant-free uplink access, the method comprising:

synchronizing, with a wireless device, predefined slots to be mapped to corresponding process identifications (PIDs) for grant-free uplink transmissions;

receiving, from the wireless device, data corresponding to a first PID in a slot mapped to the first PID;

transmitting, to the wireless device, a HARQ feedback, the HARQ feedback relating to the data corresponding to the first PID; and receiving, from the wireless device, a retransmission of the data corresponding to the first PID in a slot mapped to a second PID.

Embodiment 10

A network node configured to manage managing hybrid automatic repeat request (HARQ) processes for grant-free uplink access, the network node comprising: processing circuitry including a memory and a processor, the memory in communication with the processor, the memory having instructions that, when executed by the processor, configure the processor to:

synchronize, with a wireless device, predefined slots to be mapped to corresponding process identifications (PIDs) for grant-free uplink transmissions; and a communication interface configured to:

receive, from the wireless device, data corresponding to a first PID in a slot mapped to the first PID;

transmit, to the wireless device, a HARQ feedback, the HARQ feedback relating to the data corresponding to the first PID; and receive, from the wireless device, a retransmission of the data corresponding to the first PID in a slot mapped to a second PID.

Embodiment 11

A method, in a wireless device, for managing hybrid automatic repeat request (HARQ) processes for grant-free uplink access, the method comprising:

transmitting, to a network node, data in at least one slot available for grant-free uplink transmission; and receiving a HARQ feedback from the network node, the HARQ feedback including an index, the index identifying an earlier-in-time grant-free slot corresponding to a transmission to which the HARQ feedback corresponds to.

Embodiment 12

The method of Embodiment 11, wherein the index provides an indication of earlier-in-time grant-free slot groupings.

Embodiment 13

The method of any of Embodiments 11-12, wherein the HARQ feedback further includes a process ID with which the grant-free process is to be retransmitted as a grant-based transmission.

Embodiment 14

The method of any of Embodiments 11-12, further comprising receiving the HARQ feedback from the network node indicating which grant-free process is to be retransmitted according to the index, and a notification providing the process ID with which the grant-free process is to be retransmitted as a grant-based transmission as separate messages.

Embodiment 15

A wireless device configured to manage hybrid automatic repeat request (HARQ) processes for grant-free uplink access, the wireless device comprising:
a communication interface configured to:
transmit, to a network node, data in at least one slot available for grant-free uplink transmission; and
receive a HARQ feedback from the network node, the HARQ feedback including an index, the index identifying an earlier-in-time grant-free slot corresponding to a transmission to which the HARQ feedback corresponds to.

Embodiment 16

The wireless device of Embodiment 15, wherein the index provides an indication of earlier-in-time grant-free slot groupings.

Embodiment 17

The wireless device of any of Embodiments 15-16, wherein the HARQ feedback further includes a process ID with which the grant-free process is to be retransmitted as a grant-based transmission.

Embodiment 18

The wireless device of any of Embodiments 15-16, wherein the communication interface is further configured to the HARQ feedback from the network node indicating which grant-free process is to be retransmitted according to the index, and a notification providing the process ID with which the grant-free process is to be retransmitted as a grant-based transmission as separate messages.

Embodiment 19

A method in a network node, for managing hybrid automatic repeat request (HARQ) processes for grant-free uplink access, the method comprising:

receiving, from the wireless device, data in at least one slot available for grant-free uplink transmissions; and
transmitting, to the wireless device, a HARQ feedback, the HARQ feedback including an index, the index identifying an earlier-in-time grant-free slot corresponding to a transmission to which the HARQ feedback corresponds to.

Embodiment 20

The method of Embodiment 19, wherein the index provides an indication of earlier-in-time grant-free slot groupings.

Embodiment 21

The method of any of Embodiments 19-20, wherein the HARQ feedback further includes an indication of which grant-free process is to be retransmitted according to the index.

Embodiment 22

The method of any of Embodiments 19-20, further comprising transmitting a notification to the wireless device indicating which grant-free process is to be retransmitted according to the index, the HARQ feedback and the notification being separate messages.

Embodiment 23

A network node configured to manage hybrid automatic repeat request (HARQ) processes for grant-free uplink access, the network node comprising:
a communications interface configured to:
receive, from the wireless device, data in at least one slot available for grant-free uplink transmissions; and
processing circuitry including a memory and a processor, the memory in communication with the processor, the memory having instructions that, when executed by the processor, configure the processor to configure the communications interface to transmit, to the wireless device, a HARQ feedback, the HARQ feedback including an index, the index identifying an earlier-in-time grant-free slot corresponding to a transmission to which the HARQ feedback corresponds to.

Embodiment 24

The network node of Embodiment 23, wherein the index provides an indication of earlier-in-time grant-free slot groupings.

Embodiment 25

The network node of any of Embodiments 23-24, wherein the HARQ feedback further includes an indication of which grant-free process is to be retransmitted according to the index.

Embodiment 26

The network node of any of Embodiments 23-24, the processor further configuring the communication interface to transmit a notification to the wireless device indicating which grant-free process is to be retransmitted according to the index, the HARQ feedback and the notification being separate messages.

Embodiment 27

A wireless device configured to manage hybrid automatic repeat request (HARQ) processes for grant-free uplink access, the wireless device comprising: a processing module configured to synchronize, with a network node, predefined slots to be mapped to corresponding process identifications (PIDs) for grant-free uplink transmissions; and
    a communication interface module configured to:
        transmit, to the network node, data corresponding to a first PID in a slot mapped to the first PID; and
        receive a HARQ feedback from the network node, the HARQ feedback relating to the data corresponding to the first PID,
the processing module further configured to:
    exchange the slot mapped to the first PID with a slot mapped to a second PID; and
    instruct the communication interface module to retransmit, to the network node, the data corresponding to the first PID in the slot mapped to the second PID.

Embodiment 28

A network node configured to manage managing hybrid automatic repeat request (HARQ) processes for grant-free uplink access, the network node comprising:
    a processing module configured to:
        synchronize, with a wireless device, predefined slots to be mapped to corresponding process identifications (PIDs) for grant-free uplink transmissions; and a communication interface module configured to:
        receive, from the wireless device, data corresponding to a first PID in a slot mapped to the first PID;
        transmit, to the wireless device a HARQ feedback, the HARQ feedback relating to the data corresponding to the first PID; and
    receive, from the wireless device, a retransmission of the data corresponding to the first PID in a slot mapped to a second PID.

Some of the Abbreviations Used in this Disclosure Include

NR New Radio
SPS Semi-Persistent Scheduling
HARQ Hybrid automatic repeat request
TTI Transmission time interval
PID Process Identification
SF subframe
DCI Downlink Control Information As will be appreciated by one of skill in the art, the concepts described herein may be embodied as a method, data processing system, and/or computer program product.

Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special-purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless device for managing a hybrid automatic repeat request, HARQ, process for grant-free uplink transmissions, the uplink transmission being allocated a process identification, PID, which has a predefined mapping to a time slot, the method comprising:
transmitting data to a network node during a first time slot corresponding to a first PID according to a first mapping;
receiving a HARQ feedback signal indicating one of an acknowledgement, ACK, and a non-acknowledgement, NACK, associated with the first PID; and
when a NACK is received:
receiving an indication of a second time slot for a retransmission; and
retransmitting the data corresponding to the first PID during the second time slot.

2. The method of claim 1, wherein the second time slot corresponds to a second PID according to a second mapping, the data corresponding to the first PID being retransmitted corresponding to the second PID.

3. The method of claim 1, further comprising reverting to the predefined mapping for a data transmission subsequent to the retransmission.

4. The method of claim 1, further comprising mapping the first PID to the time slot for the second PID for a data transmission subsequent to the retransmission.

5. The method of claim 1, wherein the second mapping includes exchanging a time slot mapped to the first PID under the first mapping for a time slot mapped to a second PID under the first mapping.

6. The method of any of claim 1, wherein the second mapping includes delaying a sequence of PIDs by at least one time slot.

7. The method of claim 1, further comprising receiving the PID of the transmitted data to be retransmitted.

8. The method of claim 1, further comprising receiving an index to identify the second time slot corresponding to the transmission to which the HARQ feedback corresponds.

9. A wireless device for managing a hybrid automatic repeat request, HARQ, process for grant-free uplink transmissions, the uplink transmission being allocated a process identification, PID, which has a predefined mapping to a time slot, the wireless device comprising:
a communication interface configured to:
transmit data to a network node during a first time slot corresponding to a first PID according to a first mapping; and
receive a HARQ feedback signal indicating one of an acknowledgement, ACK, and a non-acknowledgement, NACK, associated with the first PID; and
when a NACK is received:
receive an indication of a second time slot for a retransmission; and
retransmit the data corresponding to the first PID during the second time slot.

10. The wireless device of claim 9, wherein the second time slot corresponds to a second PID according to a second mapping, the data corresponding to the first PID being retransmitted corresponding to the second PID.

11. The wireless device of claim 9, wherein the processing circuitry is further configured to revert to the predefined mapping for a data transmission subsequent to the retransmission.

12. The wireless device of claim 9, wherein the processing circuitry is further configured to map the first PID to the time slot for the second PID for a data transmission subsequent to the retransmission.

13. The wireless device of claim 9, wherein the second mapping is maintained for a predetermined time interval.

14. The wireless device of claim 9, wherein both the first and second mappings are known to the network node.

15. The wireless device of claim 9, wherein the second mapping includes exchanging a time slot mapped to the first PID under the first mapping for a time slot mapped to a second PID under the first mapping.

16. The wireless device of claim 15, wherein exchanging occurs only if a transmission opportunity for the retransmission occurs before a predetermined time.

17. The wireless device of claim 9, wherein the second mapping includes delaying a sequence of PIDs by at least one time slot.

18. The wireless device of claim 9, further comprising receiving the PID of the transmitted data to be retransmitted.

19. The wireless device of claim 9, further comprising receiving an index to identify the second time slot corresponding to the transmission to which the HARQ feedback corresponds.

20. The wireless device of claim 19, wherein the index provides an indication of earlier-in-time grant-free slot groupings.

21. The wireless device of claim 9, wherein the HARQ feedback further includes a notification of a PID with which the grant-free process is to be retransmitted as a grant-based transmission.

22. The wireless device of claim 21, wherein the HARQ feedback and the notification of the process ID with which the grant-free process is to be retransmitted as a grant-based transmission are sent as separate messages.

23. A method performed by a network node for managing a hybrid automatic repeat request, HARQ, process for a grant-free uplink transmission, the method comprising:
receiving, from a wireless device, a data transmission in a first time slot corresponding to a first process identification, PID, under a first mapping;
transmitting a HARQ feedback signal indicating one of an acknowledgement, ACK, and a non-acknowledgement, NACK, associated with the first PID, according to whether the received data transmission is successfully decoded; and
when a NACK is transmitted:
transmitting an indication of a second time slot for a retransmission;
receiving retransmitted data corresponding to the first PID during the second time slot.

24. The method of claim 23, wherein the second time slot corresponds to a second PID according to a second mapping, the data corresponding to the first PID being retransmitted corresponding to the second PID.

25. The method of claim 23, wherein the received retransmitted data contains an index identifying the data as retransmitted data.

26. A network node for managing a hybrid automatic repeat request, HARQ, process for grant-free uplink transmissions, the network node comprising:
a communication interface configured to:
receive from a wireless device a data transmission in a first time slot corresponding to a first process identification, PID, under a first mapping; and
transmit a HARQ feedback signal indicating one of an acknowledgement, ACK, and a non-acknowledgement, NACK, associated with the first PID, according to whether the received data transmission is successfully decoded; and
when a NACK is transmitted:
transmit an indication of a second time slot for a retransmission; and
receive retransmitted data corresponding to the first PID during the second time slot.

27. The network node of claim 26, wherein the second time slot corresponds to a second PID according to a second mapping, the data corresponding to the first PID being retransmitted corresponding to the second PID.

28. The network node of claim 26, wherein the received retransmitted data contains an index identifying the data as retransmitted data.

* * * * *